(12) United States Patent
Sakmar et al.

(10) Patent No.: US 11,231,153 B1
(45) Date of Patent: Jan. 25, 2022

(54) LIGHT FIXTURE WITH IMPROVED WAVEGUIDE CONTROL

(71) Applicant: ABL IP Holding LLC, Atlanta, GA (US)

(72) Inventors: John Sakmar, Atlanta, GA (US); Luke J. Siefker, Atlanta, GA (US); Adam Miller, Lakewood, CA (US); Jeff C. Carpenter, Atlanta, GA (US)

(73) Assignee: ABU IP Holding LLC, Atlanta, GA (US)

( * ) Notice: Subject to any disclaimer, the term of this patent is extended or adjusted under 35 U.S.C. 154(b) by 0 days.

(21) Appl. No.: 16/935,352

(22) Filed: Jul. 22, 2020

(51) Int. Cl.
*F21S 8/02* (2006.01)
*F21V 7/00* (2006.01)

(52) U.S. Cl.
CPC ............ *F21S 8/026* (2013.01); *F21V 7/0091* (2013.01)

(58) Field of Classification Search
CPC .. F21S 8/026; F21S 8/043; F21S 8/085; F21S 6/005; F21V 7/0091
See application file for complete search history.

(56) References Cited

U.S. PATENT DOCUMENTS

| | | |
|---|---|---|
| D266,958 S | 11/1982 | Gernhardt |
| D301,175 S | 5/1989 | Benjamin |
| D321,406 S | 11/1991 | Schlesselman |
| D405,206 S | 2/1999 | Taylor et al. |
| D451,227 S | 11/2001 | Orellana et al. |
| D465,868 S | 11/2002 | Gaskins et al. |
| D531,159 S | 10/2006 | Park |
| D553,779 S | 10/2007 | Butler |
| D557,833 S | 12/2007 | Bucher |
| D577,847 S | 9/2008 | Ruud et al. |
| D585,590 S | 1/2009 | Summerford et al. |
| D592,342 S | 5/2009 | Kinnune et al. |
| D599,496 S | 9/2009 | Lodhie |
| D599,935 S | 9/2009 | Van Klinken |
| D614,789 S | 4/2010 | van Klinken |
| D615,682 S | 5/2010 | van Klinken |
| D617,485 S | 6/2010 | Hamilton et al. |
| D636,913 S | 4/2011 | Halaquist et al. |
| D656,659 S | 3/2012 | Kong et al. |
| D657,485 S | 4/2012 | Kong et al. |

(Continued)

OTHER PUBLICATIONS

"ABB Arbor Bollard", Available Online at: https://www.cooperlighting.com/content/cooperlighting/us/en/brands/invue/abb-arbor-bollard.html, Accessed from Internet on Oct. 21, 2020, 4 page.

(Continued)

*Primary Examiner* — Leah Simone Macchiarolo
(74) *Attorney, Agent, or Firm* — Kilpatrick Townsend & Stockton LLP

(57) ABSTRACT

A light fixture includes a housing that defines a housing chamber having a housing opening. The light fixture is configured to emit light through the housing opening. The light fixture also includes a waveguide supported within the housing chamber and over the housing opening. The light fixture may include a backing plate supported within the housing chamber and biasing the waveguide towards the housing opening. The light fixture may include a transition cover with a cover body extending from a first portion of the waveguide to the housing opening and a light dam extending from the cover body towards a second portion of the waveguide.

19 Claims, 11 Drawing Sheets

(56) References Cited

U.S. PATENT DOCUMENTS

| | | | |
|---|---|---|---|
| D665,526 S | 8/2012 | Kong et al. | |
| D670,018 S | 10/2012 | Sauvage | |
| D672,076 S | 12/2012 | Guercio et al. | |
| D676,181 S | 2/2013 | Sandell et al. | |
| D678,580 S | 3/2013 | Rizzi et al. | |
| D711,034 S | 8/2014 | Sturgis et al. | |
| 8,845,152 B2 | 9/2014 | Butler et al. | |
| D741,548 S | 10/2015 | Ladewig | |
| D755,431 S | 5/2016 | Chen et al. | |
| D786,467 S | 5/2017 | Wan et al. | |
| D786,469 S | 5/2017 | Marshal | |
| 9,684,115 B1* | 6/2017 | Carney | G02B 6/0091 |
| D794,456 S | 8/2017 | Rockwell | |
| D797,980 S | 9/2017 | Maxik et al. | |
| D823,517 S | 7/2018 | Ladewig | |
| 10,132,467 B2* | 11/2018 | Poppenheimer | F21V 21/34 |
| 10,222,544 B1 | 3/2019 | Moghal | |
| D844,877 S | 4/2019 | Ladewig | |
| D853,615 S | 7/2019 | Ahrari et al. | |
| D863,644 S | 10/2019 | Gibson et al. | |
| D864,453 S | 10/2019 | Van Roosmalen et al. | |
| D877,385 S | 3/2020 | Gibson et al. | |
| D881,438 S | 4/2020 | Dahlen et al. | |
| D888,066 S | 6/2020 | Wang et al. | |
| D897,586 S | 9/2020 | Ahrari et al. | |
| 2004/0095773 A1 | 5/2004 | Gaskins et al. | |
| 2006/0056169 A1* | 3/2006 | Lodhie | F21S 8/086 362/97.3 |
| 2009/0086491 A1 | 4/2009 | Ruud et al. | |
| 2009/0109676 A1 | 4/2009 | Lodhie | |
| 2009/0296392 A1 | 12/2009 | Wilcox | |
| 2010/0080004 A1* | 4/2010 | Zhang | F21V 29/75 362/294 |
| 2011/0222284 A1 | 9/2011 | Kong et al. | |
| 2012/0057340 A1 | 3/2012 | Rami et al. | |
| 2013/0148361 A1 | 6/2013 | Chen et al. | |

OTHER PUBLICATIONS

"ARB Arbor Post Top", Cooper Lighting, Available Online at: https://www.cooperlighting.com/content/cooperlighting/us/en/brands/invue/arb-arbor-post-top.html, Accessed from Internet Oct. 21, 2020, 4 page.

"D-Series VC Size 0 LED Area Luminaire", Lithonia Lighting, Available Online at—www.lithonia.com, 2011-2020, 4 pages.

"D-Series VC Size 1 LED Area Luminaire", Lithonia Lighting, Available Online at—www.lithonia.com, 2011-2020, 4 pages.

"Gardco Pureform Bollard", 1 page.

"Hubbell Pavilion Series PA7R (Round)", Available Online at: https://www.hubbell.com/kimlighting/en/Products/Lighting-Controls/Commercial-Outdoor-Lighting/Bollards/Pavilion-Round/p/2465038, Accessed from Internet on Oct. 21, 2020, 12 pages.

"Kim Ouro UR20arm", Kim Lighting, 1 page.

"Kim Ouro UR20post", Available Online at: https://www.hubbell.com/kimlighting/en/Products/Lighting-Controls/Commercial-Outdoor-Lighting/Decorative-Post-Top/OuroPostTop/p/2442705, Accessed from Internet on Oct. 21, 2020, 56 pages.

"Kim Ouro UR28arm", Kim Lighting, 1 page.

"Kim Ouro UR28post", Kim Lighting, 1 page.

"LED Round Street Road Lamp", Available online at: m.oyatelite.com/metal-halide-lamps/led-round-street-road-lamp.html, Accessed on internet at: Sep. 11, 2020, 13 pages.

"MSA Mesa LED", Cooper Lighting, Available Online at: https://www.cooperlighting.com/content/cooper-lighting/us/en/brands/invue/msa-mesa-led.html, Accessed from Internet on Oct. 21, 2020, 3 pages.

"Philips Gardco PureForm", 1 page.

"Philips PureForm", 1 page.

"RAD1 LED Area Luminaire", Available online at: https://www.acuitybrands.com/products/compare?productA=95708&productB=979956, Accessed on internet at: Sep. 11, 2020, 3 pages.

"Radean Arm Mount LED Area Luminaire", Lithonia Lighting, 2019, 3 pages.

"Radean Post Top LED Area Luminaire", Lithonia Lighting, 2019, 4 pages.

"Slenderform Round Arm Mount LED", Available online at: Retrieved from the internet Sep. 11, 2020 from URL: https://www.bimobject.com/zh-hk/philips-gardco/product/slenderform_arm_round, Accessed on internet at: Sep. 11, 2020, 3 pages.

"Solana Bollard SL360", Strenberg Lighting, Available Online at: https://www.sternberglighting.com/solana-bollard-sl360/, Accessed from Internet on Oct. 21, 2020, 1 page.

"Solana Post Top Medium-SL660", Sternberg Lighting, Available Online at: https://www.sternberglighting.com/solanapost-top-medium/, Accessed from Internet on Oct. 21, 2020, 1 page.

"Solana Post Top SL760", Available Online at: https://landscapearchitect.com/ladetails/landscapeproduct/Area%20/%20Street%20Fixtures%20/%20Luminaires/sternberglighting/solana-post-top-sl760, Accessed from Internet Oct. 21, 2020, 19 pages.

"Solana SL630", Sternberg Lighting, Available Online at: https://www.caddetails.com/main/company/viewproductproductID=43650&companyID=5266&isFeatured=False, 3 pages.

"Sternberg Solana Arm Mount Large—SL730 & Optional Arm SL735", Sternberg Lighting, 1 page.

"Valmont Decorative AO Pole", Avenue 20 Round Non-Tapered Aluminum Post, 1 page.

"Valmont Decorative AO Pole", Dorchester 8 Round Tapered Aluminum Post, 1 page.

"VCPG Ultimate LED Parking Garage", Lithonia Lighting, Available Online at—www.lithonia.com, 2018-2020, 5 pages.

U.S. Appl. No. 29/602,954, Response to Restriction Requirement, filed Jan. 28, 2019, 49 pages.

U.S. Appl. No. 29/602,954, Restriction Requirement, dated Oct. 26, 2018, 5 pages.

U.S. Appl. No. 29/643,734, Notice of Allowance, dated Mar. 14, 2019, 5 pages.

U.S. Appl. No. 29/643,734, Notice of Allowance, dated Aug. 2, 2019, 8 pages.

U.S. Appl. No. 29/643,734, "Restriction Requirement", dated Feb. 8, 2019, 7 pages.

U.S. Appl. No. 29/643,738, Non-Final Office Action, dated Jul. 29, 2019, 7 pages.

U.S. Appl. No. 29/643,738, Notice of Allowance, dated Nov. 1, 2019, 6 pages.

U.S. Appl. No. 29/696,260, Notice of Allowance, dated Sep. 16, 2020, 9 pages.

Jackson et al., "Expanding the Market Reach of Holophane Building New Revenue Streams", Holophane, Contemporary Category Entrance, Sep. 18, 2018, 28 pages.

Kenall SenScape LED Parking Garage Lights Offer Superb Efficacy and Glare Control, Available online at: https://www.manufacturer.lighting/info/109/, Jan. 14, 2021, 4 pages.

The LuxeScape Collection, Invue Brochure by Eaton ©2019, Available online at: https://www.cooperlighting.com/s/invue/pdf/eaton-invue-luxescape-collection-brochure.pdf, 2019, 9 pages.

* cited by examiner

LIGHT FIXTURE WITH IMPROVED WAVEGUIDE CONTROL

FIELD OF THE INVENTION

Embodiments of the invention relate to an improved light fixture that can be, but that does not have to be, supported on a pole to illuminate an area.

BACKGROUND

Light fixtures for providing general illumination to an area are well known and often used in outdoor lighting applications, including roadway, pedestrian, and residential area lighting. Such light fixtures can be supported on a pole and typically include light sources (such as light emitting diodes ("LEDs")), a housing, and a waveguide or optic. Traditionally, such light fixtures have been susceptible to various problems such as light leaking from unwanted portions of the light fixture and misalignment of components such as misalignment of a waveguide relative to the LEDS, which results in reduced luminaire efficiency or LED coupling.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim According to certain embodiments of the present disclosure, a backing plate for a light fixture includes a plate body that extends in a plane and includes a first surface, a second surface, a compression feature, and a deflection limiter. The compression feature is offset a first distance from the plane in a first direction, and the compression feature includes a compression feature transverse dimension that is less than a transverse dimension of the plate body. The deflection limiter is offset a second distance from the plane in the first direction, and the deflection limiter includes a deflection limiter transverse dimension that is less than the transverse dimension of the plate body. In certain aspects, the deflection limiter transverse dimension is less than the compression feature transverse dimension.

According to some embodiments of the present disclosure, a transition cover for a light fixture includes a cover body and a light dam. The cover body includes an upper end, a lower end opposite from the upper end, an inner surface defining a passageway extending from the upper end to the lower end, and an outer surface extending from the upper end to the lower end. The upper end defines a first opening to the passageway and the lower end defines a second opening to the passageway, and a transverse dimension of the first opening is different from a transverse dimension of the second opening. The light dam extends outwardly from the outer surface of the cover body.

According to various embodiments of the present disclosure, a light fixture includes a housing defining a housing chamber having a housing opening, where the light fixture is configured to emit light through the housing opening. The light fixture also includes a waveguide supported within the housing chamber and over the housing opening. The light fixture may also include a transition cover supported on the housing where the transition cover includes a cover body and a light dam. The cover body includes an upper end contacting the waveguide and a lower end opposite from the upper end and adjacent to the housing opening, and the light dam extends outwardly from the cover body towards the waveguide.

According to some embodiments of the present disclosure, a light fixture includes a housing defining a housing chamber having a housing opening, where the light fixture is configured to emit light through the housing opening. The light fixture also includes a waveguide supported within the housing chamber and over the housing opening. The light fixture may also include a backing plate supported within the housing chamber such that the waveguide is between the housing opening and the backing plate. The backing plate may include a plate body extending in a plane and that includes a compression feature and a deflection limiter. The compression feature is offset a first distance from the plane in a first direction, and the compression feature includes a compression feature transverse dimension that is less than a transverse dimension of the plate body. The deflection limiter is offset a second distance from the plane in the first direction, and the deflection limiter includes a deflection transverse dimension that is less than the transverse dimension of the plate body. The compression feature biases the waveguide towards the housing opening.

According to certain embodiments of the present disclosure, a light fixture includes a housing defining a housing chamber having a housing opening, where the light fixture is configured to emit light through the housing opening. The light fixture also includes a waveguide supported within the housing chamber and over the housing opening. The light fixture may include a backing plate supported within the housing chamber and biasing the waveguide towards the housing opening. The light fixture may also include a transition cover with a cover body extending from a first portion of the waveguide to the housing opening and a light dam extending from the cover body towards a second portion of the waveguide.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
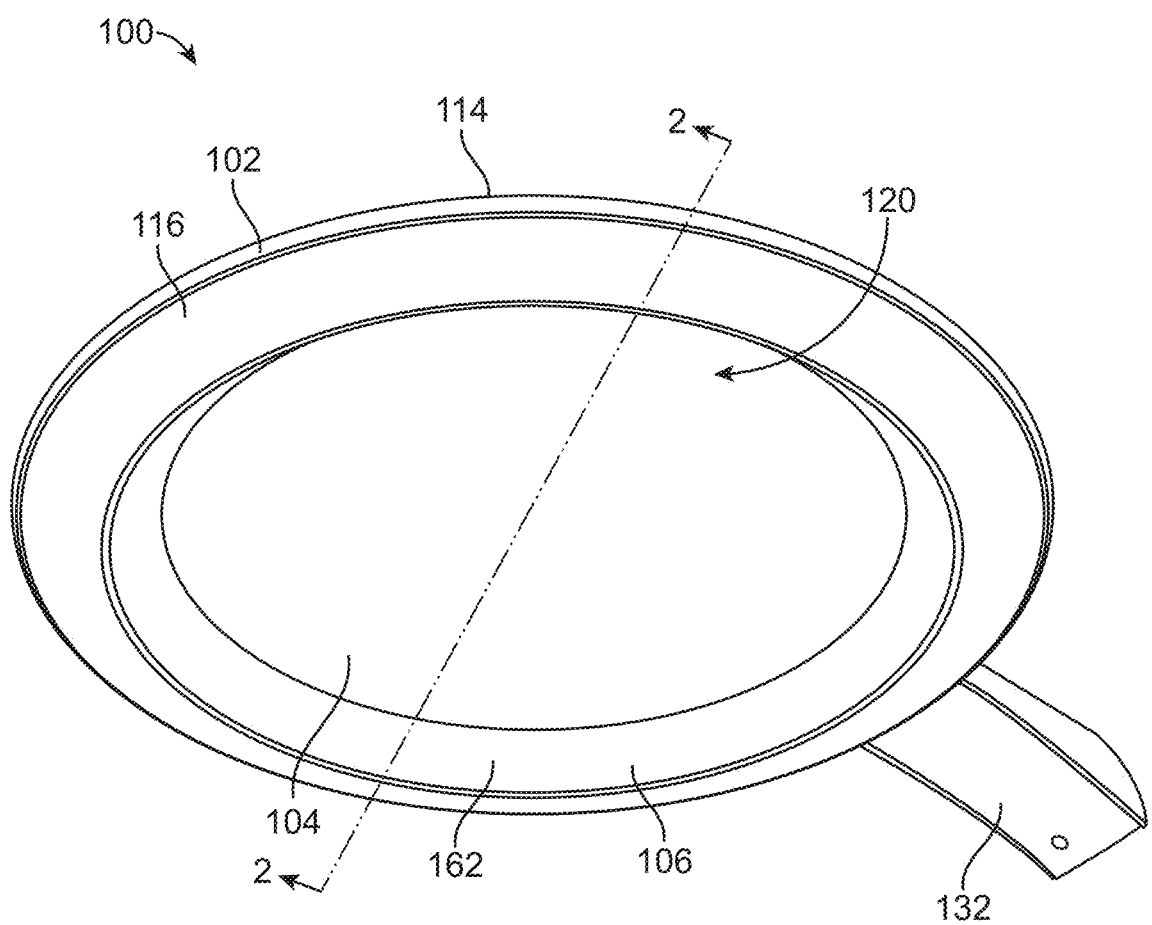
FIG. 1 is a perspective view of a light fixture according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others are intended to refer to the orientation as illustrated and described in the figure (or figures) to which the components and directions are referencing.

Embodiments of the present disclosure are directed to light fixtures that generally include a housing and a light guide panel or waveguide supported within the housing and over a housing opening. The housing may be mounted atop a pole, although it need not be in other examples, and the light fixture can be installed in different locations (i.e., indoor, outdoor, etc.) and in different manners. Moreover, while LEDs are described, it will be recognized that light fixtures may include other kinds of light sources such as fluorescent, incandescent, halogen, etc.

As used herein, a "transverse dimension" refers to the dimension across the widest portion of the component. It will be appreciated that the transverse dimension may depend on a shape of the component. A diameter of an object is an example of a transverse dimension. As such, while the description below references diameters, it will be appreciated that the shape of the light fixtures and components of the light fixtures is not considered limiting on the current disclosure.

Light Fixture

FIGS. 1-12 illustrate an example of a light fixture 100. The light fixture 100 generally includes a housing assembly 102 and an optic 104 supported on the housing assembly 102. In some examples, the light fixture 100 may include a transition cover 106 that extends between the optic 104 and the housing assembly 102. The light fixture 100 may optionally include other components including, but not limited to, a support 108, a backing plate 110, and/or one or more light sources 112.

Figure 2:
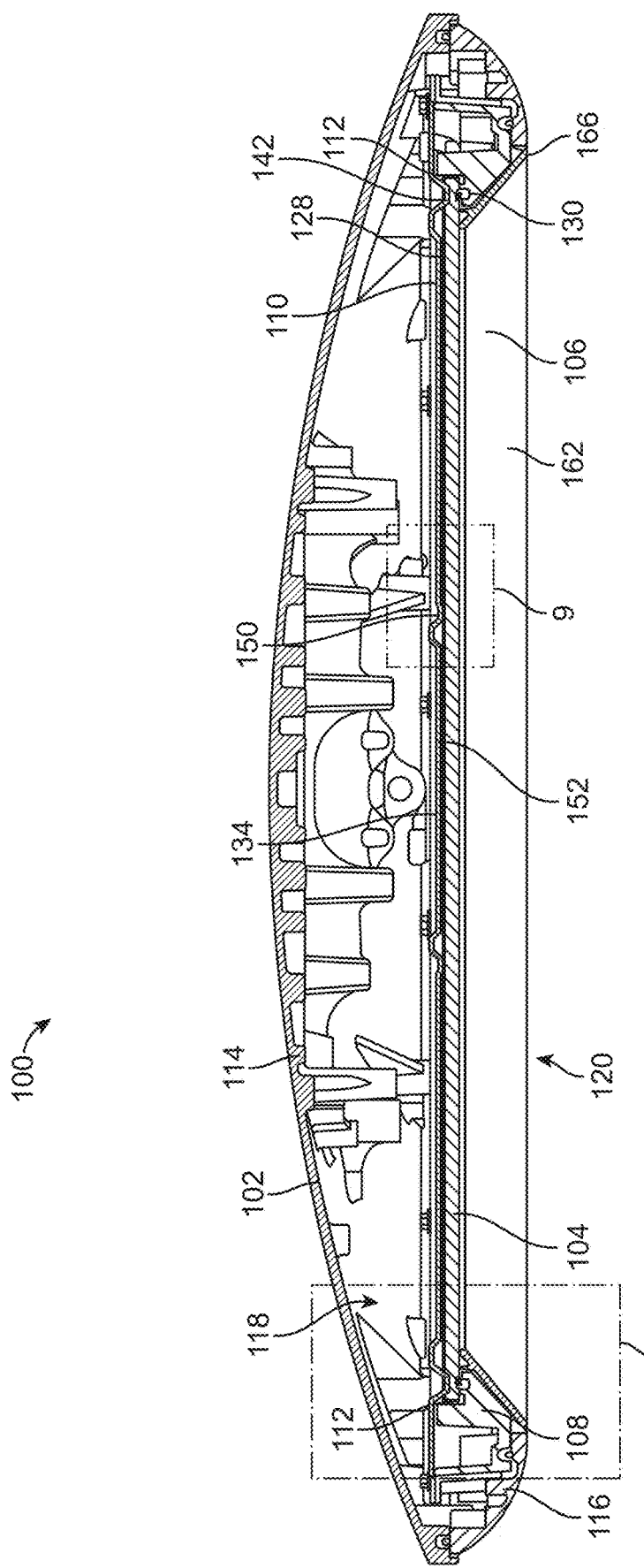
FIG. 2 is a sectional view of the light fixture of FIG. 1 taken along line 2-2.

As best illustrated in FIG. 2, the housing assembly 102 may include an upper housing 114 and a lower housing 116 that is coupled to the upper housing 114. The upper housing 114 may be coupled to the lower housing 116 through various suitable attachment mechanisms, including, but not limited to, bolts, screws, pins, hooks, clips, clasps, welding, or other suitable mechanisms as desired. In some examples, the upper housing 114 and the lower housing 116 may be integrally or monolithically formed as a single component. The housing assembly 102 defines a housing chamber 118 and includes a housing opening 120 that provides access to the housing chamber 118. In various examples, the light source(s) 112 of the light fixture 100 may be supported within the housing chamber 118, and light from the light source(s) 112 may be directed through the housing opening 120. The upper housing 114 and the lower housing 116 may be constructed from various suitable materials for a light fixture housing, including, but not limited to, various metals (e.g., aluminum, steel, etc.), plastics, composites, combinations thereof, or other suitable materials or combinations of materials as desired.

Figure 18:
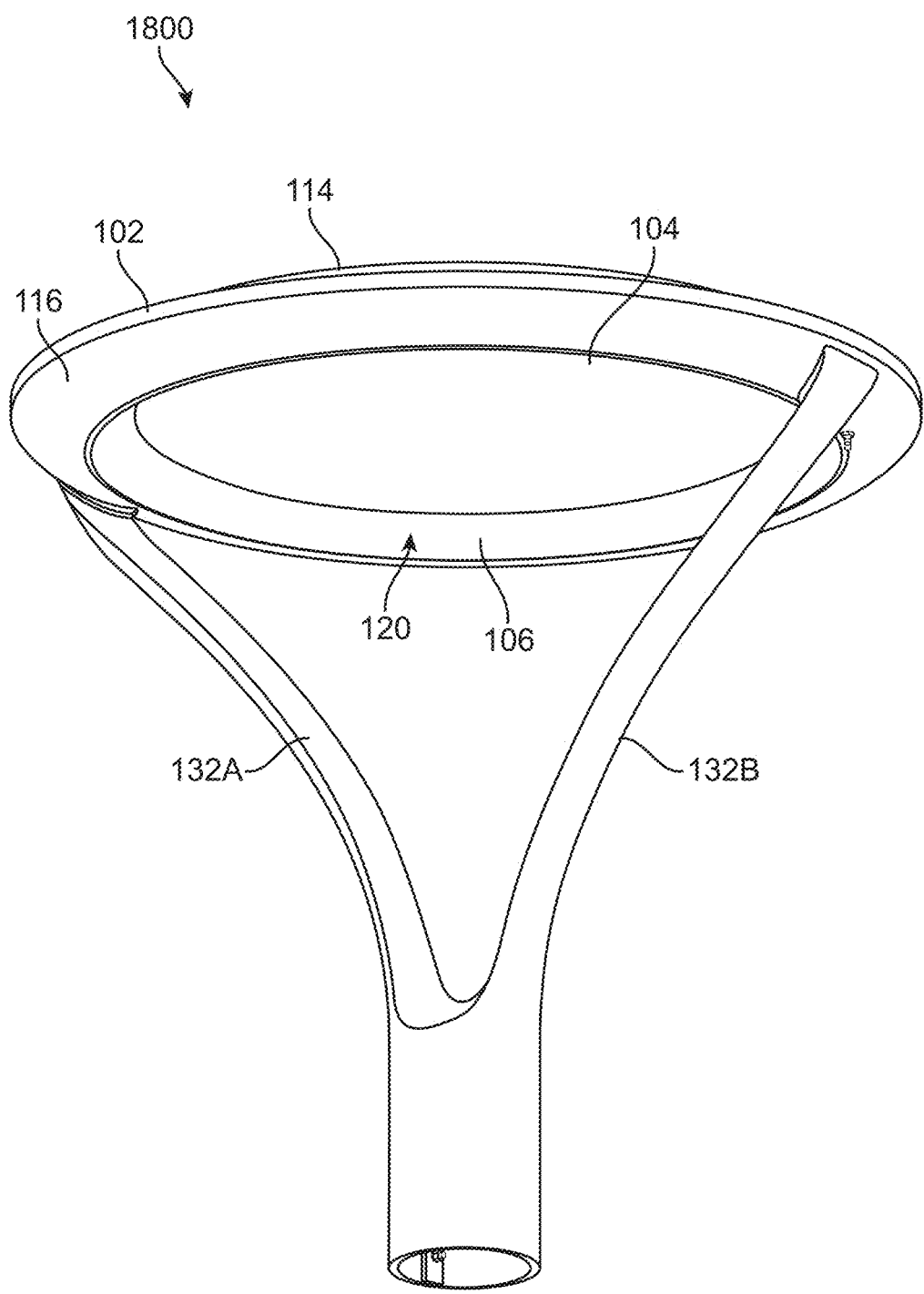
FIG. 18 is a perspective view of a light fixture according to aspects of the current disclosure.

In some optional examples, the housing assembly 102 includes one or more arms 132 that extend from the housing assembly 102 and that may be used to support the light fixture 100 at a desired installation location, such as on a post. In the example of FIGS. 1-12, the housing assembly 102 includes one arm 132 that extends outwards from the upper housing 114 and is attachable to a pole or other mounting surface. FIG. 18 illustrates an example of a light fixture 1800 that is substantially similar to the light fixture 100 except that the light fixture 1800 includes two arms 132A-B that extend from the lower housing 116 below the housing opening 120. In will be appreciated that the number of arms should not be considered limiting on the current disclosure, as in other examples the light fixture 1800 may have less than two arms that extend below the housing opening or more than two arms that extend below the housing opening. Various other types or arrangements of arms 132 may be utilized. In other examples, mounting features other than arms 132 may be utilized to support the light fixture 100 at a desired location, and the arms 132 should not be considered limiting on the current disclosure.

As best illustrated in FIG. 2, in various examples, the optic 104 may be supported in the housing chamber 118 and aligned with the housing opening 120. In various aspects, the optic 104 is a waveguide and has a perimeter edge 122 (see FIG. 12), and the one or more light sources 112 are configured to direct light into the perimeter edge 122. As used herein, a "waveguide" and an "optic" are used interchangeably to refer to the same component. Various other types of optics 104 may be utilized with the light fixture 100, and the optic 104 may be formed from various suitable materials, including, but not limited to, glass, plastic (e.g., acrylics, PMMA, etc.), or other suitable materials or combinations of materials as desired. In various examples, and as discussed in detail below, the backing plate 110 may at least partially position or orient the optic 104 relative to the housing opening 120. Optionally, a reflector 128 may be provided adjacent to the optic 104 opposite from the housing opening 120.

Figure 3:
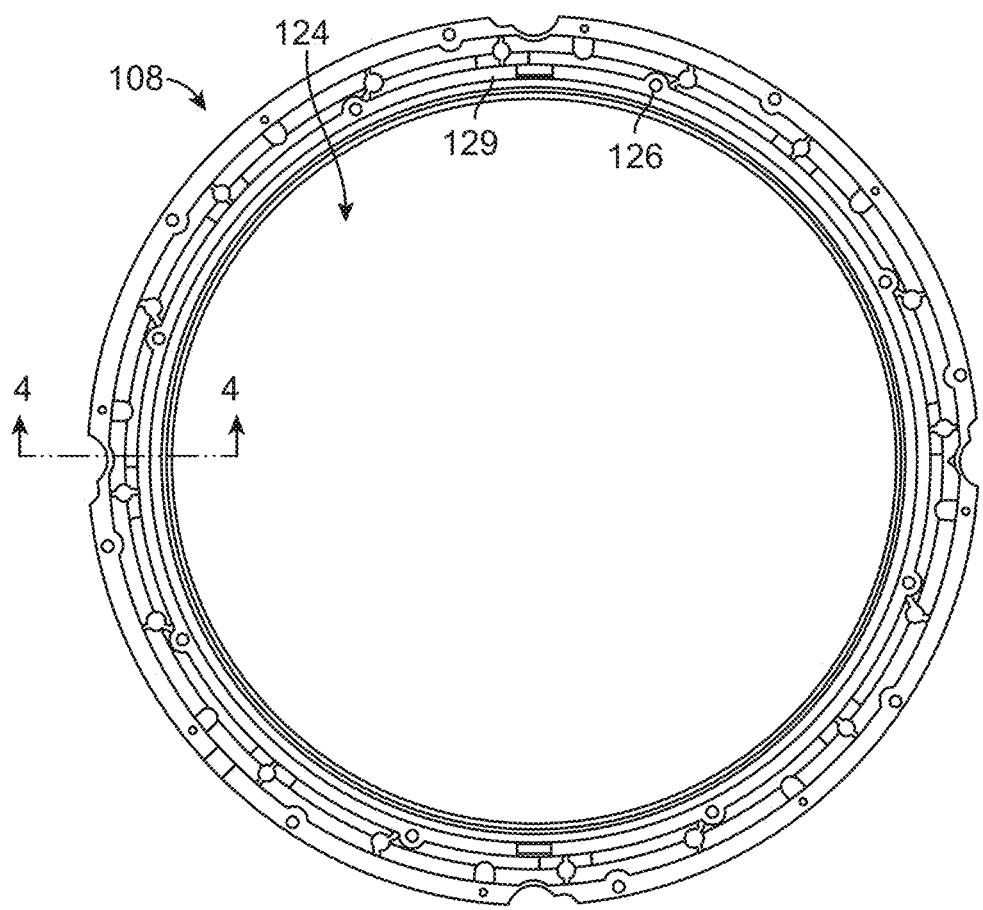
FIG. 3 is a top view of a support of the light fixture of FIG. 1 according to aspects of the current disclosure.
Figure 4:
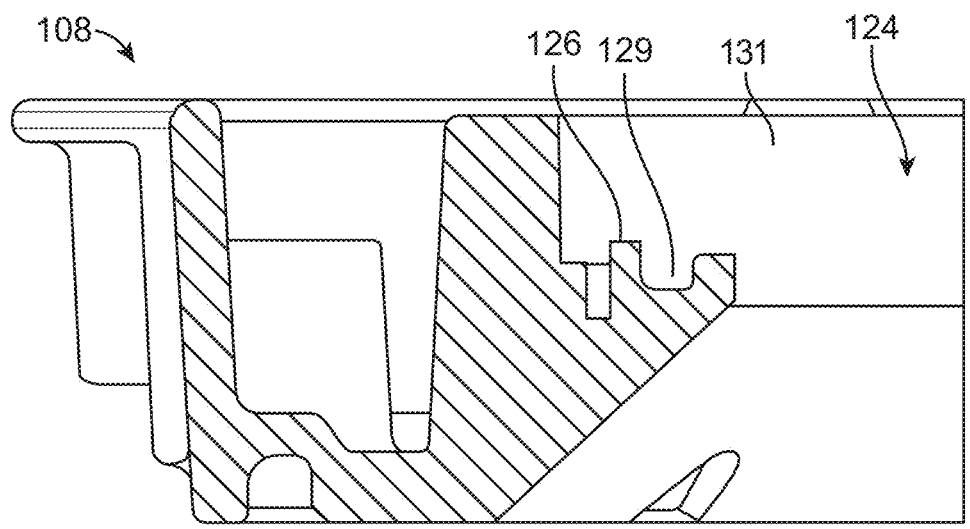
FIG. 4 is a sectional view of the support of FIG. 3 taken along line 4-4.

Referring to FIGS. 2-4, the support 108 may be within the housing chamber 118 and may optionally support other components of the light fixture 100 within the housing chamber 118. In the example of FIGS. 2-4, the support 108 at least partially supports the optic 104 and the backing plate 110 within the housing chamber 118. In various aspects, the support 108 may be coupled to the upper housing 114 and/or the lower housing 116 through various securing mechanisms such as bolts, screws, pins, clips, clasps, hooks, etc. as desired. As best illustrated in FIG. 3, the support 108 may define a support opening 124 that may be aligned or otherwise positioned relative to the housing opening 120. In some examples, a transverse dimension of the support opening 124 is less than a transverse dimension of the optic 104 and/or less than a transverse dimension of the backing plate 110.

In various examples, the support 108 includes a ledge 126 that extends into the support opening 124. Components of the light fixture 100 may optionally be supported on the ledge 126 within the housing chamber 118. In the example of FIGS. 2-4, the optic 104 is supported on the ledge 126, which helps to properly orient the optic 104 relative to the light sources 112. Optionally, the ledge 126 defines a gasket channel 129, and a gasket 130 may be supported in the gasket channel 129. When the optic 104 is assembled with the support 108, the gasket 130 may form a seal between the optic 104 and the support 108.

The light sources 112 are supported in the housing chamber 118 and may be various suitable types of light sources as desired. In the example of FIGS. 1-12, the light sources 112 are light emitting diodes (LEDs), but in other examples, the light sources may include other types of light sources such as fluorescent, incandescent, halogen, etc. In one embodiment, the light sources 112 are LEDS mounted on one or more flexible printed circuit boards. In the example of FIGS. 1-12, the light sources 112 are mounted on an upstanding wall 131 of the support 108 that extends at an angle relative to the ledge 126 of the support 108 (see FIG. 4). In some embodiments, the angle is between 45° to 135°, inclusive, and in some embodiments the angle is approximately 90°. In such a configuration, the light sources 112 are positioned to emit light into the perimeter edge 122 of the optic 104 supported on the ledge 126. In some embodiments, the light sources 112 extend entirely around the perimeter edge 122 of the optic 104, although they need not extend around the entire perimeter edge 122 in other embodiments.

As discussed in detail below, the backing plate 110 may be provided in the housing chamber 118 above the optic 104. In some cases, the backing plate 110 is supported on the support 108, although it need not be in other examples. In various examples, the backing plate 110 may at least partially position the optic 104 within the housing chamber 118 and/or may limit or prevent deflection or other movement of the optic 104 within the housing chamber 118.

In order of assembly, the light engine, comprised of 108, 122, 130, 104, 128, 112, and 110 (108+), is all assembled together with fasteners clamping 110 onto 108.

To assemble the light fixture 100, the support 108 (with associated components, such as light sources 112, backing plate 110, reflector 128, optic 104, gasket 130, etc.) is attached upwardly into the upper housing 114 via screws or other first fasteners. In other examples, the support 108 (with associated components) may be attached and/or supported on the lower housing 116. In various examples, the light sources 112, backing plate 110, reflector 128, and optic 104 may be pre-assembled with the support 108. In various aspects, the components supported by the support 108 may be coupled to the support 108 through various suitable mechanisms including, but not limited to, pins, hooks, clips, clasps, snap-fit engagement, other mechanical fasteners, chemical fasteners, or other suitable mechanisms as desired. In other examples, one or more of the components supported by the support 108 need not be coupled to the support 108, and they are retained on support 108 by compressive forces from the upper housing 114 when assembled. The lower housing 116 is then attached upwardly into the support 108 via screws or other second fasteners. Conversely, if the support 108 (with associate components) is first attached to the lower housing 116, the lower housing 116 may be attached to the upper housing 114 with fasteners that may extend through the support 108 and lower housing 116 directly into the upper housing 114. The upper housing 114 may be coupled to the lower housing 116 and/or the support 108. In various examples, the upper housing 114 coupled to the lower housing 116 and/or the support 108 may compress various components supported on the support 108 to at least partially those components on the support 108. Finally, a transition cover 106 is attached (such as via snap fitting) to the lower housing 116 so as to cover the fasteners between the support 108 (with associated components), the lower housing 116, and the upper housing 114. In this way, all of the hardware needed to assemble the light fixture 100 is hidden from view.

As discussed in detail below, the transition cover 106 extends between the housing assembly 102 and the optic 104. The transition cover 106 may be supported on the lower housing 116, although it need not be in other examples. In various examples, the transition cover 106 is at least partially positioned in the housing opening 120 and extends at least partially into the housing chamber 118. The transition cover 106 may provide a uniform boundary for light emitted from the light fixture 100 through the optic 104. The transition cover 106 may also minimize or block excess light that might otherwise escape from the light fixture 100 through the housing opening 120 at locations other than the optic 104 (e.g., at a gap defined between the transition cover 106 and the lower housing 116).

Backing Plate

As best illustrated in FIGS. 5-9, the backing plate 110 includes a plate body 134 that may extend in a plate plane 138 (FIGS. 6 and 7) and includes a perimeter edge 140. The backing plate 110 may be constructed from various suitable materials, including, but not limited to, various metals, plastics, composites, or other suitable materials as desired.

Figure 5:
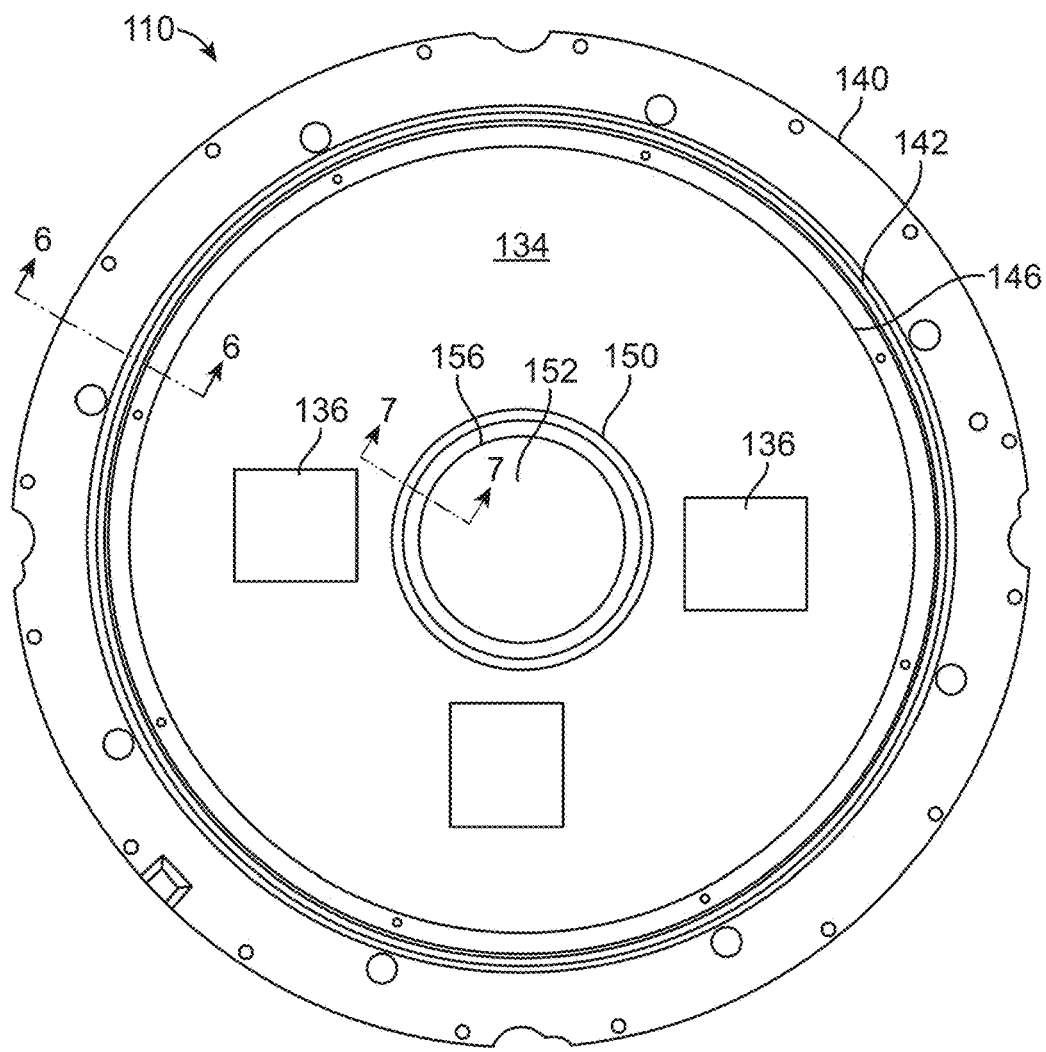
FIG. 5 is a top view of a backing plate of the light fixture of FIG. 1 according to aspects of the current disclosure.
Figure 6:
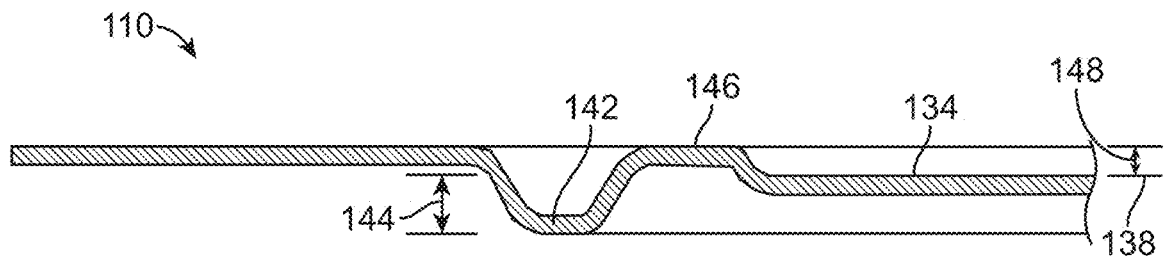
FIG. 6 is an enlarged sectional view of a portion of the backing plate of FIG. 5 taken along line 6-6 and showing a compression feature of the backing plate.

In some examples, the plate body 134 includes a compression feature 142. As illustrated in FIGS. 5 and 6, the compression feature 142 may define a closed perimeter, and a transverse dimension of the compression feature 142 may be less than a transverse dimension of the plate body 134. As best illustrated in FIG. 6, the compression feature 142 extends a first distance 144 from the plate plane 138 in a first direction. The particular shape of the compression feature 142 should not be considered limiting on the current disclosure. In the example of FIGS. 1-12, the compression feature 142 is a ridge defined by the plate body 134. Optionally, a reinforcing structure 146 is provided adjacent to the compression feature 142 to impart strength to the compression feature 142. In the example of FIGS. 1-12, the reinforcing structure 146 is a reinforcing ridge, although the reinforcing structure 146 may have various other suitable shapes as desired. In some examples, the reinforcing structure 146 extends a second distance 148 from the plate plane 138 in a second direction that is opposite from the first direction. In various aspects, the second distance 148 is less than the first distance, although it need not be in other examples.

Figure 7:
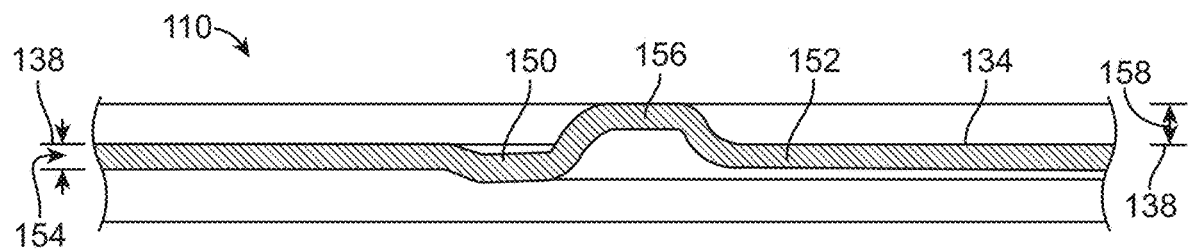
FIG. 7 is an enlarged sectional view of a portion of the backing plate of FIG. 5 taken along line 7-7 and showing a deflection limiter of the backing plate.

The plate body 134 may also include a deflection limiter 150. Similar to the compression feature 142, the deflection limiter 150 may define a closed perimeter, and a transverse dimension of the deflection limiter 150 may be less than the transverse dimension of the compression feature 142. Optionally, the deflection limiter 150 encompasses a center portion 152 of the plate body 134. In various examples, the compression feature 142 encompasses the deflection limiter 150 such that the compression feature 142 is between the deflection limiter 150 and the perimeter edge 140 of the plate body 134. As best illustrated in FIG. 7, the deflection limiter 150 extends a third distance 154 from the plate plane 138. In various examples, the third distance 154 is less than the first distance 144; however, in some cases, the third distance 154 may be greater than or equal to the first distance 144. The third distance 154 may optionally be less than the second distance 148, although it need not be. In the example of FIGS. 1-12, the deflection limiter 150 is a ridge, although the shape of the deflection limiter 150 should not be considered limiting on the current disclosure. Similar to the compression feature 142, a reinforcing structure 156 may optionally be provided adjacent to the deflection limiter 150 to impart strength to the deflection limiter 150. In the example of FIGS. 1-12, the reinforcing structure 156 is a reinforcing ridge, although the reinforcing structure 156 may have various other suitable shapes as desired. In some examples, the reinforcing structure 156 extends a fourth distance 158 from the plate plane 138 in the second direction that is opposite from the first direction. In various aspects, the fourth distance 158 is greater than the third distance 154, although it need not be in other examples. In certain cases, the fourth distance 158 is less than or equal to the second distance 148.

Figure 8:
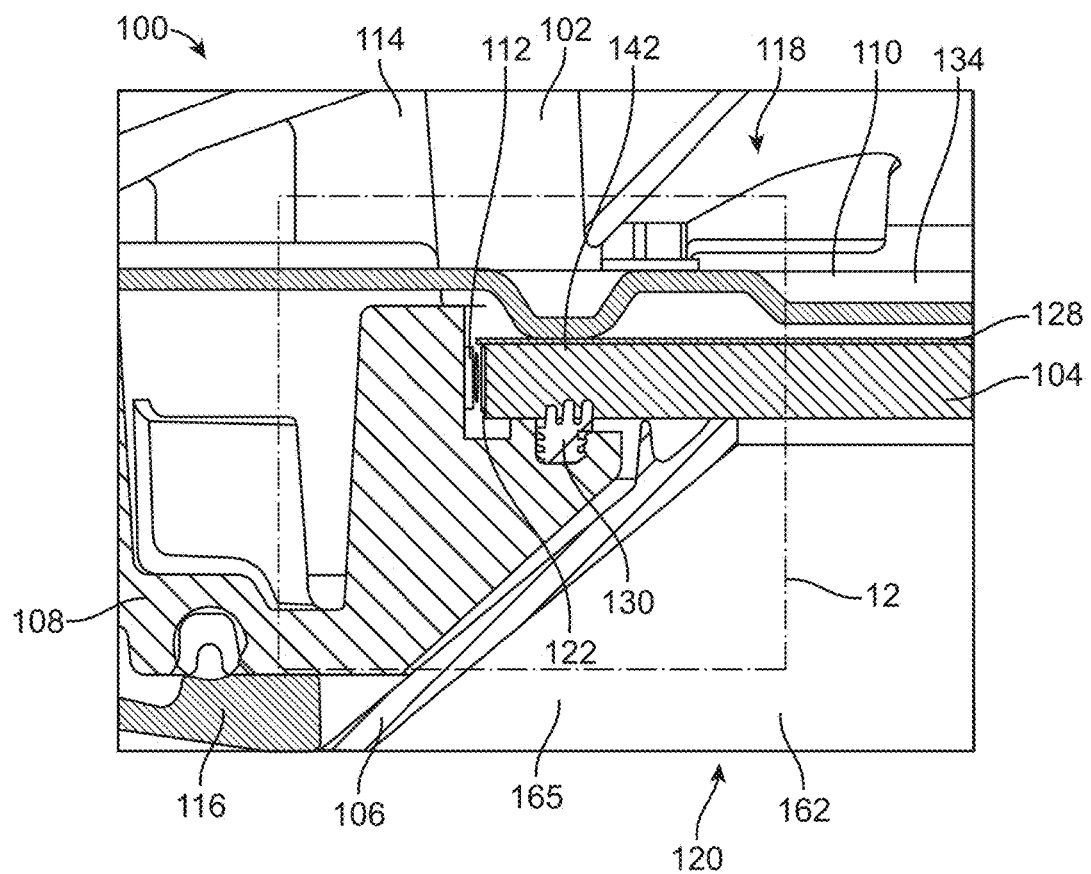
FIG. 8 is an enlarged sectional view taken at inset rectangle 8 of FIG. 2 and showing the compression feature of the backing plate.

Referring to FIGS. 2 and 8, when the backing plate 110 is assembled with the light fixture 100, the compression feature 142 of the backing plate 110 may engage the optic 104 (and/or the reflector 128) and bias the optic 104 towards the housing opening 120. In various examples, the compression feature 142 biases the optic 104 against the support 108 to position the optic 104 relative to the support 108. In some examples where the gasket 130 is included, the compression feature 142 may bias the optic 104 against the gasket 130 such that a seal is formed between the optic 104 and the support 108. If the compression feature 142 has a closed perimeter (i.e., is continuous), it will compress against the entire perimeter of the optic 104 to form a completely continuous seal (360° in so embodiments) between the optic 104 and the support 108. In other examples, the compression feature 142 need not form a closed perimeter.

Figure 9:
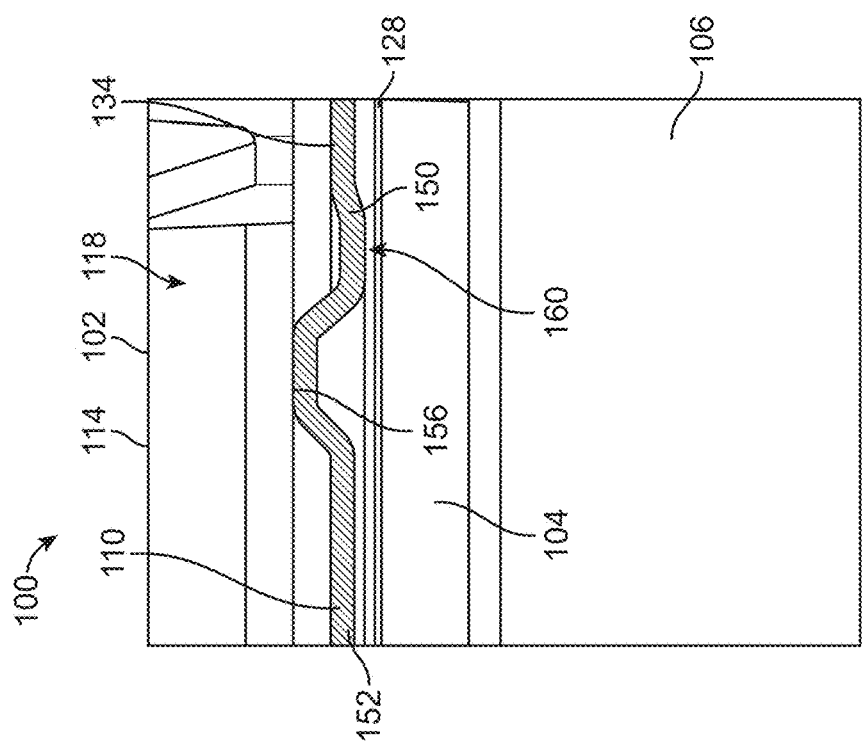
FIG. 9 is an enlarged sectional view taken at inset rectangle 9 of FIG. 2 and showing the deflection limiter of the backing plate.

Referring to FIGS. 2 and 9, when the backing plate 110 is assembled with the light fixture 100, a gap 160 may be defined between the deflection limiter 150 and the optic 104 (and/or the reflector 128). In some embodiments, in a relaxed state whereby no external forces are exerted on the optic 104, the compression feature 142 is the only part of the backing plate 110 to contact the optic 104 and/or reflector 128. In various examples, the gap 160 may allow for movement or flexing of the optic 104 (e.g., responsive to an upwards force, such as, e.g., pressure washing), and the deflection limiter 150 may control the amount of movement of the optic 104 by selectively engaging and contacting the optic 104 after the optic 104 has deflected a predetermined distance (i.e., the distance of the gap 160). Such control from the deflection limiter 150 may minimize or reduce damage to the optic 104 or other components of the light fixture 100. Optionally, a cushioning or insulating material (not shown), including but not limited to a foam insert, may be provided between the center portion 152 and the optic 104, under the reinforcing structure 156, under the reinforcing structure 146, under the plate body 134, and/or at various other locations as desired.

Referring back to FIG. 5, one or more cutout features 136 may optionally be defined in the plate body 134. The cutout features 136 may be selectively removed as desired to facilitate installation of additional components with the light fixture 100, including but not limited to various sensors and/or communication devices.

Transition Cover

Figure 10:
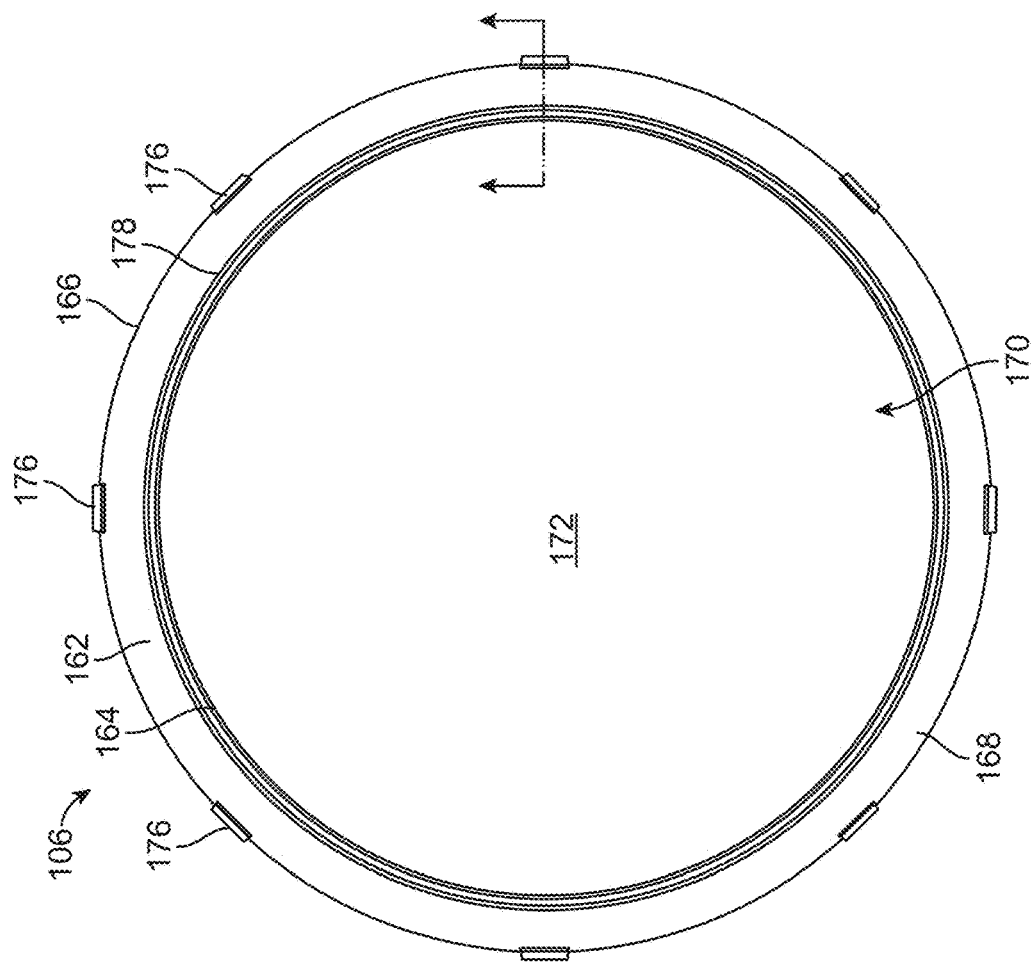
FIG. 10 is a top view of a transition cover of the light fixture of FIG. 1 according to aspects of the current disclosure.
Figure 11:
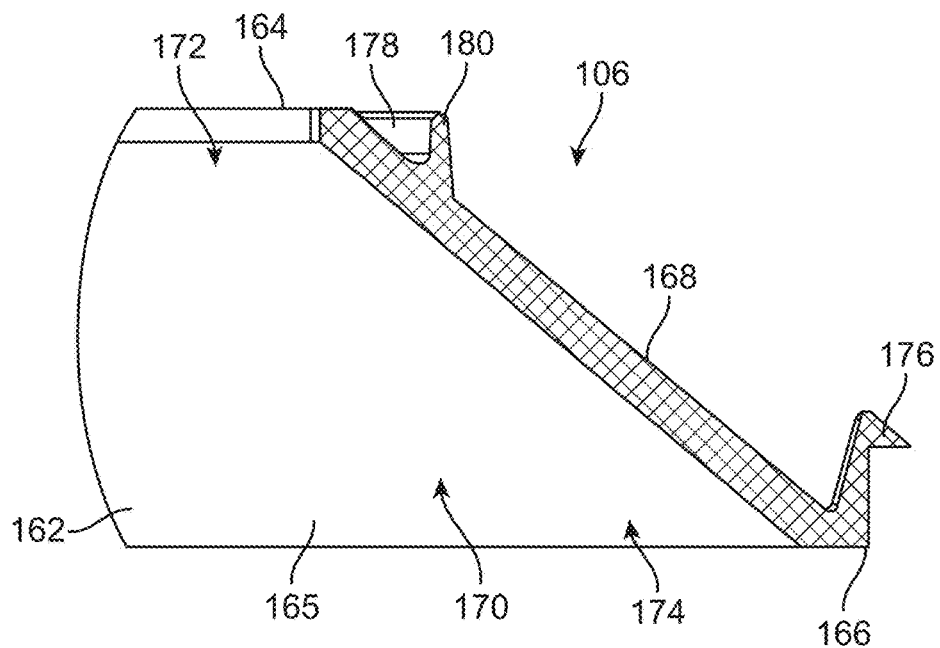
FIG. 11 is an enlarged sectional view of a portion of the transition cover of FIG. 10 taken along line 11-11.
Figure 12:
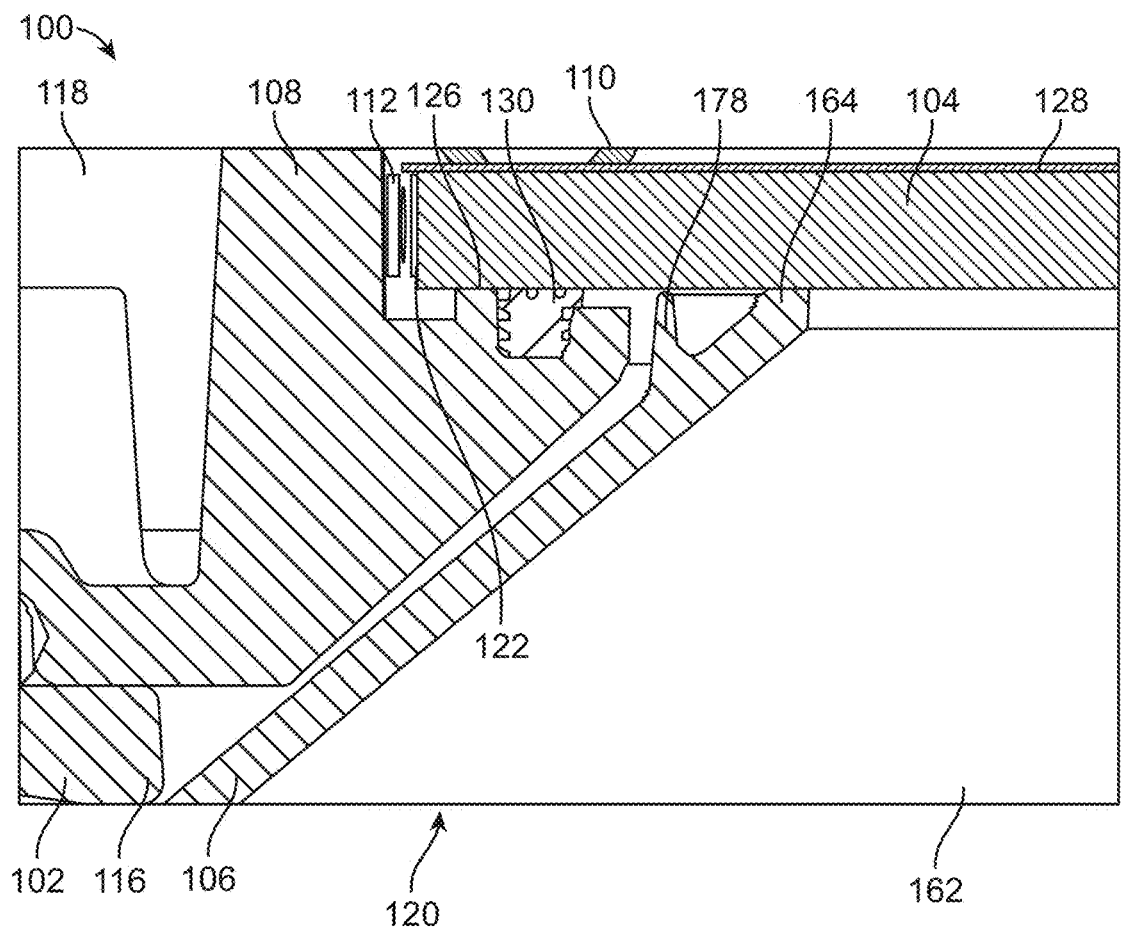
FIG. 12 is an enlarged sectional view taken at inset circle 12 of FIG. 8 and showing the transition cover.

As best illustrated in FIGS. 10-12, the transition cover 106 includes a cover body 162 that has an upper end 164, a lower end 166 opposite from the upper end 164, an inner surface 165, and an outer surface 168. The transition cover 106 may be constructed from various suitable materials such as various metals, plastics, composites, etc. as desired. In one non-limiting embodiment, the transition cover 106 is made from a white plastic having inherently reflective properties. In other non-limiting embodiments, the inner surface 165 of the transition cover 106 may be treated so as to be reflective.

In various examples, the inner surface 165 defines a passageway 170 that extends from the upper end 164 to the lower end 166. In some examples, the upper end 164 defines a first opening 172 to the passageway 170 and the lower end 166 defines a second opening 174 to the passageway 170. Optionally, a transverse dimension of the upper end 164 is different from (e.g., less than or greater than) a transverse dimension of the lower end 166, although it need not be in other examples, and the shape of the transition cover 106 should not be considered limiting on the current disclosure. In the example of FIGS. 10-12, the transverse dimension of the upper end 164 is less than the transverse dimension of the lower end 166. In various aspects, the transverse dimension of the upper end 164 is less than the transverse dimension of the optic 104.

Optionally, and as best illustrated in FIG. 10, the transition cover 106 may include one or more clips 176 that may selectively engage the lower housing 116 (or other suitable component of the light fixture 100) to couple (e.g., via snap-fit or other suitable coupling mechanisms) the transition cover 106 to the light fixture 100. The shape or number clips 176 should not be considered limiting on the current disclosure, and in other examples, the clips 176 may be omitted and other mounting or joining features may be utilized to support the transition cover 106 on the light fixture 100, including, but not limited to, adhesives, permanent assembly mechanisms, and/or semi-permanent assembly mechanisms.

As best illustrated in FIGS. 11 and 12, the transition cover 106 includes a light dam 178 that extends outwardly from the outer surface 168. In various examples, the light dam 178 extends at an oblique angle relative to the cover body 162, although in other examples the light dam 178 may extend at various suitable angles as desired relative to the cover body 162. The light dam 178 includes a dam end 180. As best illustrated in FIG. 11, in some optional examples, the upper end 164 is arranged in a plane, and the light dam 178 may extend from the cover body 162 such that the dam end 180 extends in a plane that is different from the plane of the upper end 164. In other words, the light dam 178 may optionally extend above the upper end 164 or below the upper end 164. In still other examples, the dam end 180 may extend coplanar with the upper end 164. In certain examples, the light dam 178 defines a closed perimeter, and a transverse dimension of the light dam 178 may be greater than a transverse dimension of the upper end 164. In other examples, the light dam 178 need not define a closed perimeter and may instead define a non-closed, or open, perimeter.

Referring to FIGS. 2 and 12, when the transition cover 106 is assembled with the light fixture 100, the lower end 166 may be adjacent to the lower housing 116 and optionally in the housing opening 120. The upper end 164 of the transition cover 106 may contact a portion of the optic 104. In various examples, the light dam 178 extend towards the optic 104. In the example of FIGS. 1-12, the light dam 178 is spaced apart from the optic 104, although in other examples, the light dam 178 may contact the optic 104 such that a seal is formed between the light dam 178 and the optic 104. The light dam 178 extending from the cover body 162 may block or limit reflected light from leaking behind the transition cover 106 and from the light fixture 100 (e.g., through a gap defined between the transition cover 106 and the support 108, through a gap defined between the transition cover 106 and the lower housing 116, etc.). The transition cover 106 may also conceal various attachment mechanisms above the transition cover 106 in the housing chamber 118 (e.g., attachment mechanisms attaching the support 108 to the housing assembly 102).

Figure 13:
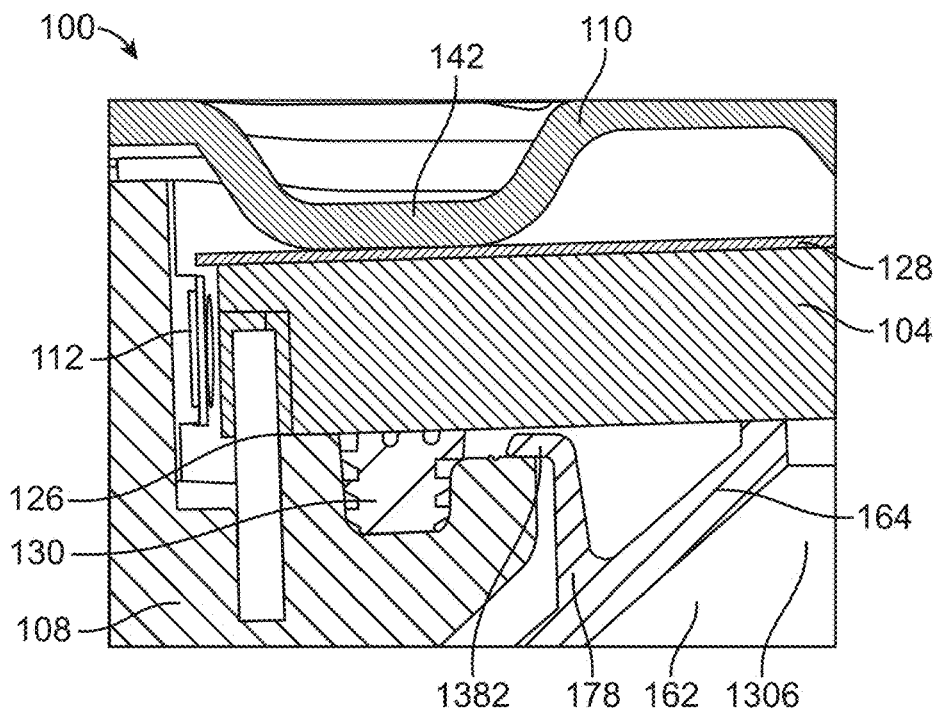
FIG. 13 is an enlarged sectional view of a portion of another light fixture having a transition zone according to aspects of the current disclosure.
Figure 14:
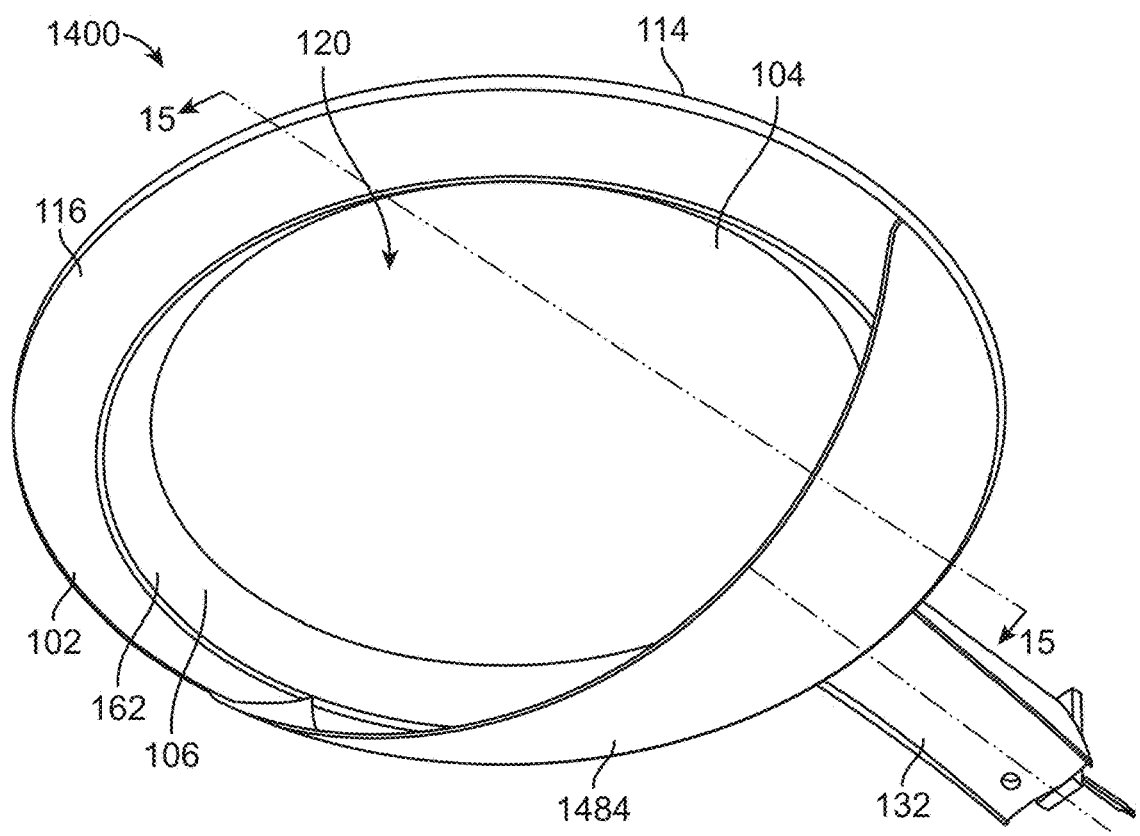
FIG. 14 is a perspective view of a light fixture according to aspects of the current disclosure having a light shield.

FIG. 13 illustrates another example of a portion of a transition cover 1306 that is substantially similar to the transition cover 106 except that the light dam 178 includes a hook portion 1382 that may selectively engage another component of the light fixture. In the example of FIG. 13, the hook portion 1382 is engaged with the ledge 126 of the support 108.

Light Shield

Figure 15:
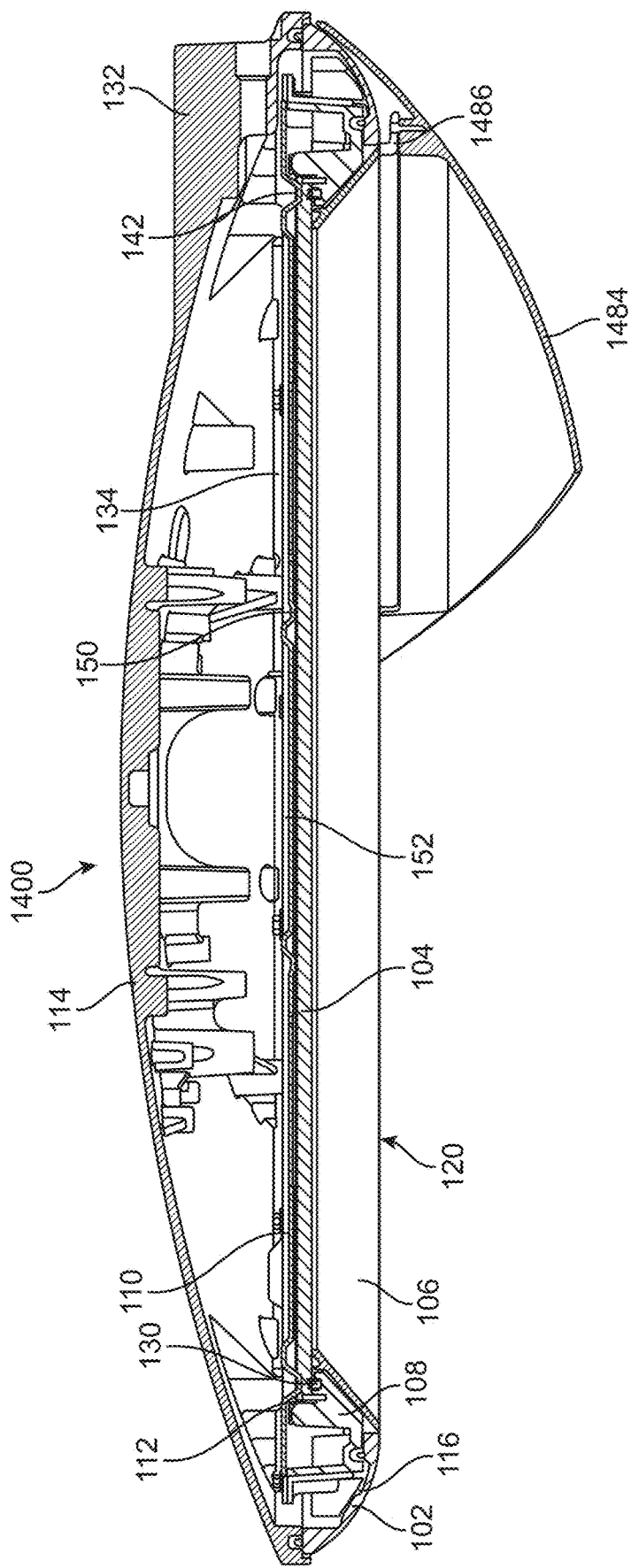
FIG. 15 is a sectional view of the light fixture of FIG. 14 taken along line 15-15.
Figure 16:
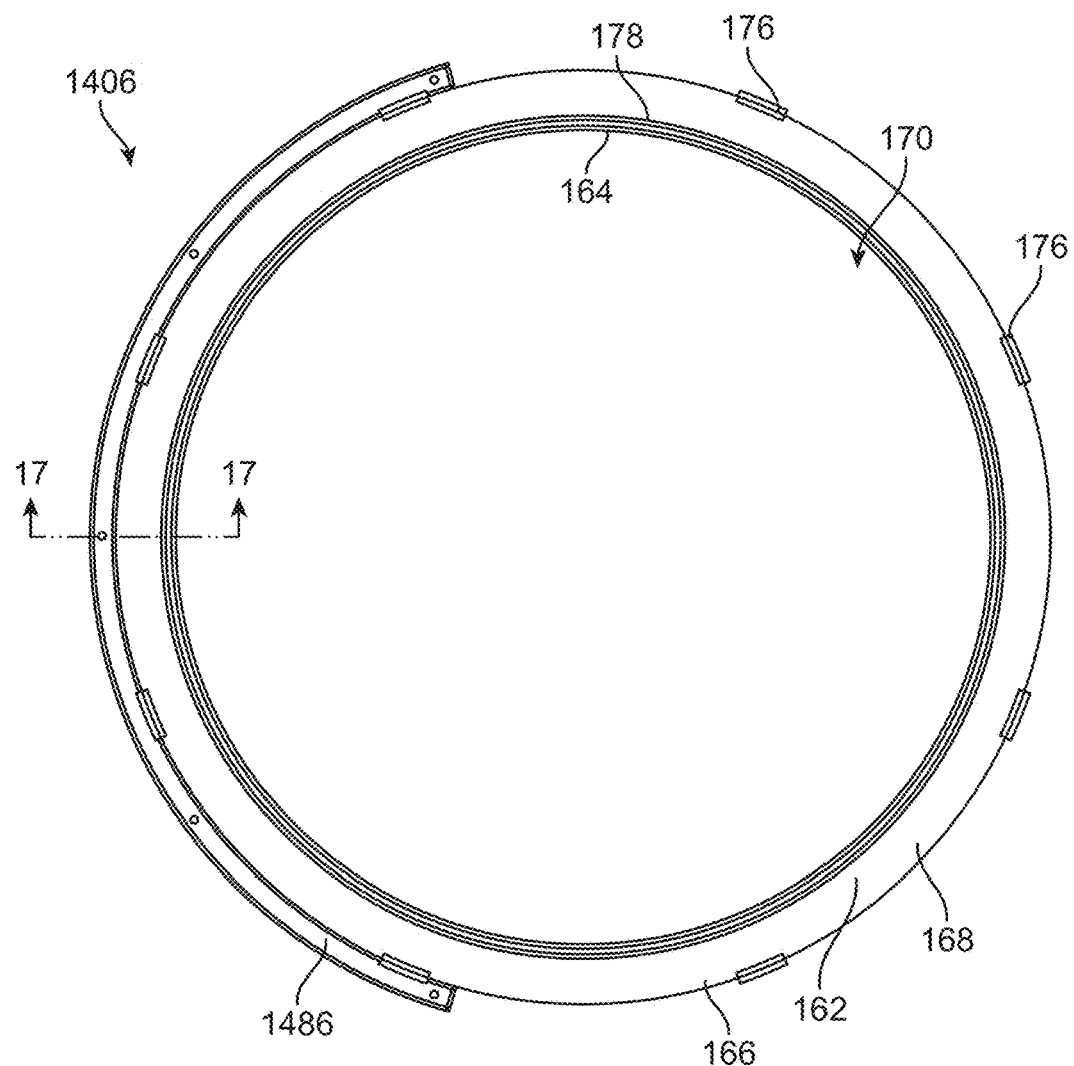
FIG. 16 is a top view of a transition cover the light fixture of FIG. 14 according to aspects of the current disclosure.
Figure 17:
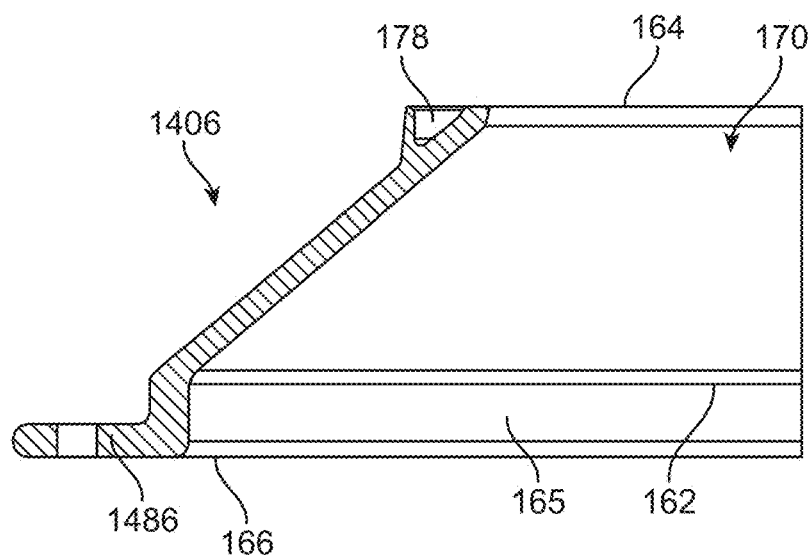
FIG. 17 is an enlarged sectional view of a portion of the transition cover of FIG. 16 taken along line 17-17.

FIGS. 14-17 illustrate another example of a light fixture 1400 that is substantially similar to the light fixture 100 except that the light fixture 1400 includes a light shield 1484. As best illustrated in FIG. 15, the light shield 1484 may extend below the housing opening 120 and may cover at least a portion of the housing opening 120. By covering select portions of the housing opening 120, the light shield 1484 may selectively direct light from the light fixture 1400 towards certain desired locations and/or block light from the light fixture 1400 from reaching undesired locations. In the example of FIGS. 14-17, the light shield 1484 has a curved or arcuate shape, although the particular shape of the light shield 1484 should not be considered limiting on the current disclosure. Moreover, the amount of the housing opening 120 that is covered by the light shield 1484 in a plan view (i.e., directly below the light fixture 1400) should not be considered limiting on the current disclosure. For example, in other cases, other light shields 1484 may cover a higher percentage or a lesser percentage of the housing opening 120 compared to the light shield 1484 illustrated in FIGS. 14-17.

In some examples, the light shield 1484 may be coupled to a transition cover 1406 that is substantially similar to the transition cover 106 except that the transition cover 1406 includes an attachment flange 1486 that extends along at least a portion of the lower end 166. In some cases, and as illustrated in FIG. 15, when the light shield 1484 is attached to the transition cover 1406, the light shield 1484 may optionally cover a portion of the housing opening 120 and a portion of the lower housing 116. In other examples, the light shield 1484 may be attached to other components of the light fixture 1400 (e.g., the lower housing 116) as desired.

Examples

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1. A backing plate for a light fixture, the backing plate comprising a plate body extending in a plane, the plate body comprising: an first surface; a second surface; a compression feature offset a first distance from the plane in a first direction, wherein the compression feature comprises a compression feature transverse dimension that is less than a transverse dimension of the plate body; and a deflection limiter offset a second distance from the plane in the first direction, wherein the deflection limiter comprises a deflection limiter transverse dimension that is less than the transverse dimension of the plate body.

Example 2. The backing plate of any of the preceding or subsequent examples or combination of examples, wherein the compression feature encompasses the deflection limiter.

Example 3. The backing plate of any of the preceding or subsequent examples or combination of examples, wherein the deflection limiter surrounds a central portion of the plate body.

Example 4. The backing plate of any of the preceding or subsequent examples or combination of examples, wherein the compression feature is between the deflection limiter and a perimeter edge of the plate body.

Example 5. The backing plate of any of the preceding or subsequent examples or combination of examples, wherein the compression feature is a first ridge defined by the plate body and wherein the deflection limiter is a second ridge defined by the plate body.

Example 6. The backing plate of any of the preceding or subsequent examples or combination of examples, further comprising a reinforcing ridge adjacent to the compression feature and extending in a second direction from the plane that is opposite from the first direction.

Example 7. The backing plate of any of the preceding or subsequent examples or combination of examples, wherein the reinforcing ridge extends a third distance from the plane, and wherein the third distance is less than the first distance.

Example 8. The backing plate of any of the preceding or subsequent examples or combination of examples, further comprising a reinforcing ridge adjacent to the deflection limiter and extending in a second direction from the plane that is opposite from the first direction.

Example 9. The backing plate of any of the preceding or subsequent examples or combination of examples, wherein the reinforcing ridge extends a third distance from the plane, and wherein the third distance is greater than the second distance.

Example 10. A transition cover for a light fixture, the transition cover comprising: a cover body comprising: an upper end; a lower end opposite from the upper end; an inner surface defining a passageway extending from the upper end to the lower end; and an outer surface extending from the upper end to the lower end, wherein the upper end defines a first opening to the passageway and the lower end defines a second opening to the passageway, wherein a transverse dimension of the first opening is different from a transverse dimension of the second opening; and a light dam extending outwardly from the outer surface of the cover body.

Example 11. The transition cover of any of the preceding or subsequent examples or combination of examples, wherein the light dam extends at an oblique angle relative to the cover body.

Example 12. The transition cover of any of the preceding or subsequent examples or combination of examples, wherein the upper end of the cover body is arranged in a first plane, wherein the light dam extends towards the first plane and comprises a dam end, and wherein the dam end is arranged in a second plane that is different than the first plane.

Example 13. The transition cover of any of the preceding or subsequent examples or combination of examples, wherein the second plane is parallel to the first plane.

Example 14. The transition cover of any of the preceding or subsequent examples or combination of examples, wherein the upper end comprises a first diameter, wherein the lower end comprises a second diameter that is greater than the first diameter, and wherein light dam defines a transverse dimension having a third diameter that is less greater than the first diameter and less than the second diameter.

Example 15. A light fixture comprising: a housing defining a housing chamber having a housing opening, wherein the light fixture is configured to emit light through the housing opening; a waveguide supported within the housing chamber and over the housing opening; and a transition cover supported on the housing and comprising: a cover body comprising an upper end contacting the waveguide and a lower end opposite from the upper end and adjacent to the housing opening; and a light dam extending outwardly from the cover body towards the waveguide.

Example 16. The light fixture of any of the preceding or subsequent examples or combination of examples, wherein the light dam comprises a dam end, and wherein a gap is defined between the waveguide and the dam end.

Example 17. The light fixture of any of the preceding or subsequent examples or combination of examples, wherein the light dam extends at an oblique angle relative to the cover body.

Example 18. The light fixture of any of the preceding or subsequent examples or combination of examples, wherein the upper end of the cover body is arranged in a first plane, wherein the light dam extends towards the first plane and comprises a dam end, and wherein the dam end is arranged in a second plane that is different than the first plane.

Example 19. The light fixture of any of the preceding or subsequent examples or combination of examples, further comprising a backing plate within the housing chamber and such that the waveguide is between the transition cover and the backing plate, wherein the backing plate comprises a plate body extending in a plane and comprising: an first surface; a second surface; a compression feature offset a first distance from the plane in a first direction, wherein the compression feature comprises a compression feature transverse dimension that is less than a transverse dimension of the plate body; and a deflection limiter offset a second distance from the plane in the first direction, wherein the deflection limiter comprises a deflection limiter transverse dimension that is less than the transverse dimension of the plate body.

Example 20. The light fixture of any of the preceding or subsequent examples or combination of examples, wherein the deflection limiter surrounds a central portion of the plate body, and wherein the light fixture further comprises a cushioning member between the central portion of the plate body and the waveguide.

Example 21. The light fixture of any of the preceding or subsequent examples or combination of examples, wherein the waveguide and the backing plate are supported on a support within the housing chamber.

Example 22. The light fixture of any of the preceding or subsequent examples or combination of examples, further comprising a reflector within the housing chamber between the backing plate and the waveguide.

Example 23. The light fixture of any of the preceding or subsequent examples or combination of examples, wherein the waveguide comprises a perimeter edge, and wherein the light fixture further comprises a plurality of light sources configured to emit light into the perimeter edge of the waveguide.

Example 24. A light fixture comprising: a housing defining a housing chamber having a housing opening, wherein the light fixture is configured to emit light through the housing opening; a waveguide supported within the housing chamber and over the housing opening; and a backing plate supported within the housing chamber such that the waveguide is between the housing opening and the backing plate, wherein the backing plate comprises a plate body extending in a plane and comprising: a compression feature offset a first distance from the plane in a first direction, wherein the compression feature comprises a compression feature transverse dimension that is less than a transverse dimension of the plate body; and a deflection limiter offset a second distance from the plane in the first direction, wherein the deflection limiter comprises a deflection limiter transverse dimension that is less than the transverse dimension of the plate body, wherein the compression feature biases the waveguide towards the housing opening.

Example 25. The light fixture of any of the preceding or subsequent examples or combination of examples, further comprising a support within the housing chamber and supporting the waveguide; and a gasket on at least a portion of the support, wherein the compression feature biases the waveguide against the gasket.

Example 26. The light fixture of any of the preceding or subsequent examples or combination of examples, wherein a deflection gap is defined between the waveguide and the deflection limiter.

Example 27. The light fixture of any of the preceding or subsequent examples or combination of examples, further comprising a transition cover supported on the housing and comprising: a cover body comprising an upper end contacting the waveguide and a lower end opposite from the upper end and adjacent to the housing opening; and a light dam extending outwardly from the cover body towards the waveguide.

Example 28. A light fixture comprising: a housing defining a housing chamber having a housing opening, wherein the light fixture is configured to emit light through the housing opening; a waveguide supported within the housing chamber and over the housing opening; a backing plate supported within the housing chamber and biasing the waveguide towards the housing opening; and a transition cover comprising a cover body extending from a first portion of the waveguide to the housing opening and a light dam extending from the cover body towards a second portion of the waveguide.

Example 29. The light fixture of any of the preceding or subsequent examples or combination of examples, wherein the light dam comprises a dam end, and wherein a gap is defined between the dam end and the second portion of the waveguide.

Example 30. The light fixture of any of the preceding or subsequent examples or combination of examples, wherein the cover body contacts the first portion of the waveguide.

Example 31. The light fixture of any of the preceding or subsequent examples or combination of examples, wherein the backing plate comprises a plate body extending in a plane and comprising: a compression feature offset a first distance from the plane in a first direction, wherein the compression feature comprises a compression feature transverse dimension that is less than a transverse dimension of the plate body; and a deflection limiter offset a second distance from the plane in the first direction, wherein the deflection limiter comprises a deflection limiter transverse dimension that is less than the transverse dimension of the plate body, wherein the compression feature biases the waveguide towards the housing opening.

Example 32. The light fixture of any of the preceding or subsequent examples or combination of examples, wherein the light fixture further comprises a support within the housing chamber, wherein the support at least partially supports the waveguide, and wherein the compression feature biases the waveguide against the support.

Example 33. The light fixture of any of the preceding or subsequent examples or combination of examples, wherein the deflection limiter surrounds a central portion of the plate body, and wherein the light fixture further comprises a cushioning member between the central portion of the plate body and the waveguide.

Example 34. The light fixture of any of the preceding or subsequent examples or combination of examples, wherein the light fixture further comprises: a plurality of light sources configured to emit light into a perimeter edge of the waveguide; and a reflector within the housing chamber between the backing plate and the waveguide.

Example 35. The light fixture of any of the preceding or subsequent examples or combination of examples, wherein the light dam extends at an oblique angle relative to the cover body.

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

That which is claimed:

1. A light fixture comprising:
   a housing defining a housing chamber having a housing opening, wherein the light fixture is configured to emit light through the housing opening;
   a waveguide supported within the housing chamber and over the housing opening, the waveguide comprising a perimeter edge;
   a backing plate supported within the housing chamber and biasing the waveguide towards the housing opening; and
   a transition cover comprising:
     a cover body extending from a first portion of the waveguide to the housing opening; and
     a light dam extending from the cover body towards a second portion of the waveguide, wherein the second portion of the waveguide is closer to the perimeter edge than the first portion of the waveguide.

2. The light fixture of claim 1, wherein the light dam comprises a dam end, and wherein a gap is defined between the dam end and the second portion of the waveguide.

3. The light fixture of claim 1, wherein the cover body contacts the first portion of the waveguide.

4. The light fixture of claim 1, wherein the backing plate comprises a plate body extending in a plane and comprising:
   a compression feature offset a first distance from the plane in a first direction, wherein the compression feature comprises a compression feature transverse dimension extending in a direction of the plane that is less than a transverse dimension of the plate body; and
   a deflection limiter offset a second distance from the plane in the first direction, wherein the deflection limiter comprises a deflection limiter transverse dimension extending in the direction of the plane that is less than the transverse dimension of the plate body,
   wherein the compression feature biases the waveguide towards the housing opening.

5. The light fixture of claim 4, wherein the light fixture further comprises a support within the housing chamber, wherein the support at least partially supports the waveguide, and wherein the compression feature biases the waveguide against the support.

6. The light fixture of claim 4, wherein the deflection limiter surrounds a central portion of the plate body, and wherein the light fixture further comprises a cushioning member between the central portion of the plate body and the waveguide.

7. The light fixture of claim 1, wherein the light fixture further comprises:
   a plurality of light sources configured to emit light into the perimeter edge of the waveguide; and
   a reflector within the housing chamber between the backing plate and the waveguide.

8. The light fixture of claim 1, wherein the light dam extends at an oblique angle relative to the cover body.

9. A light fixture comprising:
   a housing defining a housing chamber having a housing opening, wherein the light fixture is configured to emit light through the housing opening;
   a waveguide supported within the housing chamber and over the housing opening;
   a transition cover supported on the housing and comprising:

a cover body comprising an upper end contacting the waveguide and a lower end opposite from the upper end and adjacent to the housing opening; and
   a light dam extending outwardly from the cover body towards the waveguide; and
  a backing plate within the housing chamber and such that the waveguide is between the transition cover and the backing plate, wherein the backing plate comprises a plate body extending in a plane and comprising:
   a first surface;
   a second surface;
   a compression feature offset a first distance from the plane in a first direction, wherein the compression feature comprises a compression feature transverse dimension extending in a direction of the plane that is less than a transverse dimension of the plate body; and
   a deflection limiter offset a second distance from the plane in the first direction, wherein the deflection limiter comprises a deflection limiter transverse dimension extending in the direction of the plane that is less than the transverse dimension of the plate body.

10. The light fixture of claim 9, wherein the light dam comprises a dam end, and wherein a gap is defined between the waveguide and the dam end.

11. The light fixture of claim 9, wherein the light dam extends at an oblique angle relative to the cover body.

12. The light fixture of claim 9, wherein the upper end of the cover body is arranged in a first plane, wherein the light dam extends towards the first plane and comprises a dam end, and wherein the dam end is arranged in a second plane that is different from the first plane.

13. The light fixture of claim 9, wherein the deflection limiter surrounds a central portion of the plate body, and wherein the light fixture further comprises a cushioning member between the central portion of the plate body and the waveguide.

14. The light fixture of claim 9, wherein the waveguide and the backing plate are supported on a support within the housing chamber.

15. The light fixture of claim 9, wherein the waveguide comprises a perimeter edge, and wherein the light fixture further comprises a plurality of light sources configured to emit light into the perimeter edge of the waveguide.

16. A light fixture comprising:
  a housing defining a housing chamber having a housing opening, wherein the light fixture is configured to emit light through the housing opening;
  a waveguide supported within the housing chamber and over the housing opening; and
  a backing plate supported within the housing chamber such that the waveguide is between the housing opening and the backing plate, wherein the backing plate comprises a plate body extending in a plane and comprising:
   a compression feature offset a first distance from the plane in a first direction, wherein the compression feature comprises a compression feature transverse dimension extending in a direction of the plane that is less than a transverse dimension of the plate body; and
   a deflection limiter offset a second distance from the plane in the first direction, wherein the deflection limiter comprises a deflection limiter transverse dimension extending in the direction of the plane that is less than the transverse dimension of the plate body,
   wherein the compression feature biases the waveguide towards the housing opening.

17. The light fixture of claim 16, further comprising:
  a support within the housing chamber and supporting the waveguide; and
  a gasket on at least a portion of the support, wherein the compression feature biases the waveguide against the gasket.

18. The light fixture of claim 16, wherein a deflection gap is defined between the waveguide and the deflection limiter.

19. The light fixture of claim 16, further comprising a transition cover supported on the housing and comprising:
  a cover body comprising an upper end contacting the waveguide and a lower end opposite from the upper end and adjacent to the housing opening; and
  a light dam extending outwardly from the cover body towards the waveguide.

\* \* \* \* \*